April 21, 1953        H. J. MURPHY        2,635,667
BLIND NUT RETAINING DEVICE
Filed Aug. 9, 1950
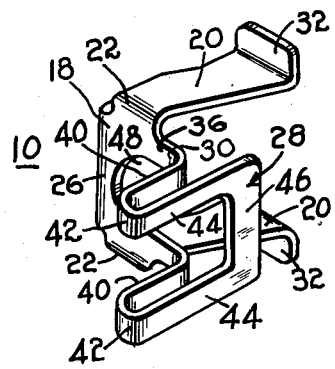
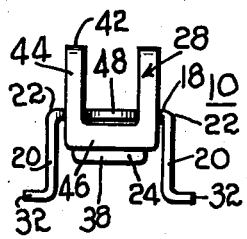
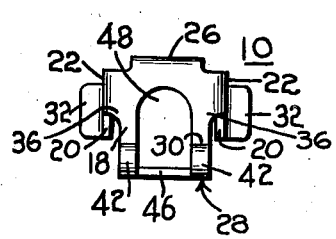
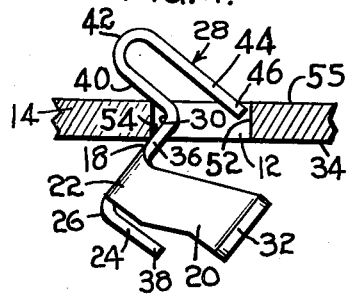
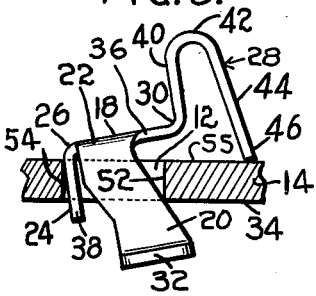
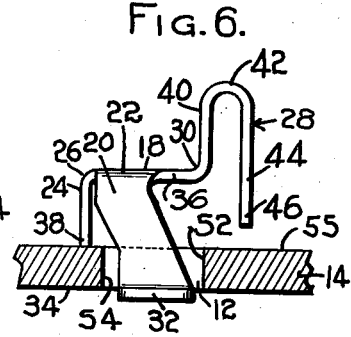
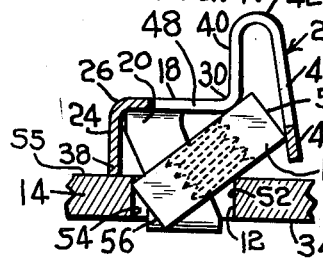
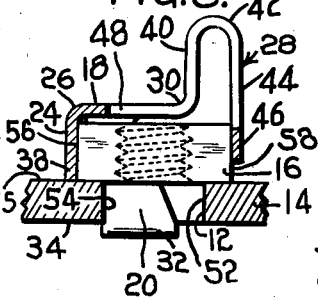
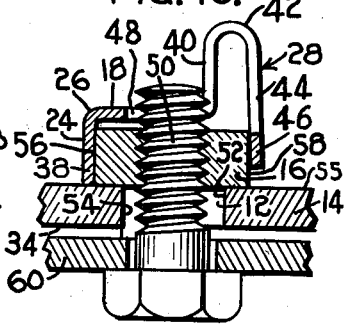
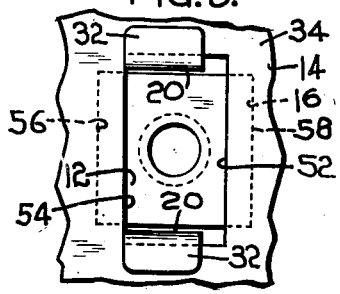
INVENTOR:
HOWARD J. MURPHY,
BY Robert E Ross
      AGENT.

Patented Apr. 21, 1953

2,635,667

UNITED STATES PATENT OFFICE 2,635,667

BLIND NUT RETAINING DEVICE

Howard J. Murphy, Lynnfield, Mass., assignor to United-Carr Fastener Corporation, Cambridge, Mass., a corporation of Massachusetts Application August 9, 1950, Serial No. 178,501

3 Claims. (Cl. 151—41.75)

This invention relates generally to fastening devices, and has particular reference to a cage member for a caged nut fastening device.

The object of the invention is to provide a cage member for a caged nut fastening device which is adapted for blind assembly into an opening in a supporting panel.

A further object of the invention is to provide a cage member of this type which is adapted to be passed through an opening in a panel from the front side thereof to receive and retain a fastening device on the rear side of the panel.

A still further object of the invention is to provide a cage for a caged nut fastening device which is adapted to receive and retain a fastening member therein after the cage is assembled with a supporting panel through an opening therein.

Other objects of the invention, will, in part, be obvious, and will, in part, appear hereinafter.

In my prior co-pending application Serial Number 147,468, filed March 3, 1950, I have shown a nut cage construction designed to have a nut or equivalent fastening element preliminarily introduced therein prior to assembly of the nut cage in a panel opening. The present invention utilizes certain structural features thereof in conjunction with an improved structural arrangement designed for introduction of a fastening element after assembly in a panel opening.

In the drawing:

Fig. 1 is a perspective view of a cage member embodying the features of the invention;

Fig. 2 is a view in side elevation of the fastener of Fig. 1;

Fig. 3 is a top plan view of the fastener of Fig. 1;

Fig. 4 is a view in elevation illustrating the first step in the assembly of the cage member into an opening in a panel;

Fig. 5 is a view in elevation illustrating the second step in the assembly operation;

Fig. 6 is a view in elevation of the cage member completely assembled into the opening;

Fig. 7 is a view in elevation illustrating the method of assembling a nut into the cage;

Fig. 8 is a view in elevation of the fully assembled cage and nut;

Fig. 9 is a bottom plan view of the assembly of Fig. 8;

Fig. 10 is a view in elevation, partly in section, of the cage and nut assembly illustrating the method of attaching an article thereto.

Referring to the drawing, there is illustrated a cage member 10, which is adapted to be assembled into an opening 12 in a supporting panel 14, to receive and retain a fastening member therein, such as a nut 16.

The cage 10 comprises a base 18, which in the illustrated embodiment, is substantially square, a pair of legs 20 extending downwardly from opposite sides 22 of the base, a spacing arm 24 extending downwardly from one side 26 connecting the opposite sides 22, and a resilient member 28 disposed on the connecting side 30 opposite the connecting side 26. The legs 20, the spacing arm 24, and the resilient member 28 form a space to receive a nut 16 as will be hereinafter described.

The legs 20 are each provided with outwardly extending feet 32 for bearing against the outer face 34 of the panel, and the legs 20 are joined to the base 18 at corresponding ends of opposite sides 22 and are inclined relative to the base so that the feet 32 are disposed centrally under the opposite sides 22. The shape of the legs provides an overhanging portion 36 to enable the cage to be assembled into the opening in a manner to be described hereinafter. In some cases the legs 20 need not be joined to the base at the extreme ends of the opposite sides, but must merely be off center to an extent which depends on the relative dimensions of the base and the opening 12. The arrangement of legs 20 is similar to that in my prior application Serial Number 147,468, previously referred to, except that the legs will locate the base 18 closer to the inner side of the panel as hereafter explained.

The spacing arm 24, which extends downwardly from the side 26, terminates in a free end 38 which is spaced upwardly from the plane of the feet 32 a predetermined distance which is greater than the thickness of the panel 14. The resilient member 28 comprises an upwardly extending portion 40, a reverse bend portion 42, and a downwardly extending portion 44 which terminates in a free end 46 disposed below the plane of the base 18 in spaced relation to the plane of the feet 32. The free end 46 is also in spaced opposing relation with the spacing arm 24 a distance which is slightly less than the width of the nut 16. The base 18 is provided with an opening 48 to allow a bolt 50 to be assembled with the nut without interference with the base, and the opening 48 may be continued into the resilient member 28 to impart greater resilience thereto.

Referring to Fig. 4, there is illustrated the first step in the assembly of the device. The reverse bend portion 42 of the cage is inserted into the opening 12, and the cage is then tipped so that the free end 46 of the resilient member passes behind the adjacent edge 52 of the panel. The cage is then moved in the opening until the edge 52 of the panel contacts the overhanging portion 36 of the base, and the cage is then tipped toward the base so that the connecting side 26 in which the spacing arm is maintained passes behind the adjacent edge 54 of the panel (see Fig. 5). As this movement occurs, the free end 46 of the resilient member contacts the rear face 55 of the panel and springs slightly outwardly, and further tipping movement of the cage in this manner causes the spacing arm 24 to pass over the edge 54 and snap behind the panel so that the feet 32 bear against the outer face 34 of the panel (see Fig. 6). It should be noted that after assembly of the cage, it is not essential that the panel be gripped between the feet 32 in the outer side and the spacing arm 24 and the resilient member 28 in the inner side, since these parts of the device may be spaced apart a distance somewhat greater than the thickness of the particular panel illustrated to enable the cage to accommodate thicker panels if necessary.

After the cage is assembled in the opening, the nut may be assembled into the cage in the manner illustrated in Fig. 7. One edge 58 of the nut is inserted into the opening 12 so as to pass between the legs 20, and contact the free end 46 of the resilient member 28. As the nut is forced further into the opening, the free end 46 springs outwardly and allows opposite edge 56 of the nut to pass the adjacent edge 54 of the panel. The nut is then gripped between the free end 46 of the resilient member and the spacing arm 24, and retained in position to receive the bolt 50 to enable an article such as another panel 60 to be attached to the panel 14. It should be further noted that after assembly of the cage, legs 20, due to their length, cause the base to position an inserted nut in adjacent substantially parallel relation with the inner side of the panel. Such arrangement differs from that in my prior application Serial No. 147,468, wherein corresponding base and a nut introduced with the cage are located relatively remote from the panel, and the nut is subsequently drawn down away from the base into proximate relation with the panel after a bolt is inserted in the nut.

If it is desired to disassemble the article 60 from the panel, the bolt may be removed from the nut, and the cage will retain the nut in position to prevent it from falling into an inaccessible position behind the panel. Although in the illustrated embodiment the nut is square, a suitable cage embodying the features of the invention may be constructed to accommodate nuts of any desired shape. The cage may be cheaply and rapidly formed from a single piece of sheet metal on automatic machines.

Since certain other obvious modifications may be made in the device without departing from the scope of the invention, it is intended that all matter contained herein be interpreted in an illustrative, and not in a limiting sense.

I claim:

1. A cage member for assembly through an opening in a supporting panel from the outer side thereof and for receiving and retaining behind the inner side of the panel a nut member thereafter inserted through the opening from the outer side of the panel, said cage member comprising a base, a pair of legs extending downwardly from opposite sides of the base, panel-engaging means on said legs for bearing against the outer side of the panel, an arm extending downwardly from an edge of the base connecting said opposite sides to a free end and adapted to be located behind the inner side of the panel, and a resilient arm on the edge of the base opposite said connecting edge, said resilient arm extending beyond the plane of the base to a free end portion, said panel-engaging means being inset from both said resilient arm and said first arm, said legs being inset from said resilient arm and from the free end of said first arm and connecting with said base in off-center relation so as to provide an overhang between said legs and said resilient arm adapting said resilient arm to be hooked through the opening and adapting said base, said legs and said first arm to be passed through the opening, and said legs being of a length to cause the base to position an inserted nut member in adjacent spaced substantially parallel relation with the inner side of the panel when said panel-engaging means bear against the outer side of the panel, said free end portion of said resilient arm being disposed in spaced opposing relation with the first arm and being cooperative therewith to receive and grip therebetween a nut member inserted through the panel opening.

2. A cage member for assembly through an opening in a supporting panel from the outer side thereof and for receiving and retaining behind the inner side of the panel a nut member thereafter inserted through the opening from the outer side of the panel, said cage member comprising a base, a pair of legs extending downwardly from opposite sides of the base, panel-engaging means on said legs for bearing against the outer side of the panel, an arm extending downwardly from an edge of the base connecting said opposite sides to a free end and adapted to be located behind the inner side of the panel, and a resilient arm on the edge of the base opposite said connecting edge, said resilient arm extending upwardly from the base to a reverse bend portion and then downwardly beyond the plane of the base to a free end portion, said panel-engaging means being inset from both said resilient arm and said first arm, said legs being inset from said resilient arm and from the free end of said first arm and connecting with said base in off-center relation so as to provide an overhang between said legs and said resilient arm adapting said resilient arm to be hooked through the opening and adapting said base, said legs and said first arm to be passed through the opening, and said legs being of a length to cause the base to position an inserted nut member in adjacent spaced substantially parallel relation with the inner side of the panel when said panel-engaging means bear against the outer side of the panel, said free end portion of said resilient arm being disposed in spaced opposing relation with the first arm and being cooperative therewith to receive and grip therebetween a nut member inserted through the panel opening.

3. A cage member for assembly through an opening in a supporting panel and for receiving and retaining behind the inner side of the panel a nut member thereafter inserted through the opening from the outer side of the panel, said cage member comprising a base, panel-engaging means spaced below the base for bearing against the outer side of the supporting panel on opposite sides of the assembly opening, said panel-engaging means being disposed centrally in relation to the base so that the base will be aligned with the opening when the cage member is assembled in the opening, a pair of inclined legs supporting said panel-engaging means, said legs being of a length to cause the base to position an inserted nut member in adjacent substantially parallel relation with the inner side of the panel when said panel-engaging means bear against the outer side of the panel, said inclined legs extending downwardly from opposite sides of the base in off-center relation to the base so as to provide an overhanging edge on the base, a resilient arm on said overhanging edge, said resilient arm including a portion connecting with said overhanging edge and extending upwardly from the base to a reverse bend portion and a downwardly extending portion extending downwardly from the reverse bend portion in spaced relation to said overhanging edge to a free end portion below the plane of the base, said resilient arm being disposed to be hooked into the opening so that the base and said pair of inclined legs may be passed edgewise therethrough and then rotated relative to the plane of the panel with said free end portion of said resilient arm bearing against the inner side of the panel so that the plane of the cage base is parallel thereto, and thereby pulling the panel-engaging means towards the panel to bear against the outer side thereof, and a second arm extending downwardly from the edge of the base opposite said overhanging edge, said second arm being disposed to snap into engagement with the inner side of the panel when the panel-engaging means is pulled towards the panel, said second arm and said free end portion of said resilient arm being cooperative to receive and grip therebetween a nut member inserted through the panel opening.

HOWARD J. MURPHY.

References Cited in the file of this patent

UNITED STATES PATENTS

| Number | Name | Date |
| --- | --- | --- |
| 680,609 | Marquardt | Aug. 13, 1901 |
| 991,447 | Kennedy | May 2, 1911 |
| 1,261,146 | Marble | Apr. 2, 1918 |
| 1,355,450 | Carlson | Oct. 12, 1920 |
| 2,040,374 | Grimes | May 12, 1936 |
| 2,201,401 | Jones | May 21, 1940 |
| 2,283,122 | Murphy | May 12, 1942 |